(12) United States Patent
Zhao

(10) Patent No.: US 10,681,146 B2
(45) Date of Patent: Jun. 9, 2020

(54) METHOD AND APPARATUS FOR ISOLATING PAGE COOKIE

(71) Applicant: Guangzhou UCWEB Computer Technology Co., Ltd., Guangdong (CN)

(72) Inventor: Xiangyang Zhao, Guangdong (CN)

(73) Assignee: Guangzhou UCWEB Computer Technology Co., Ltd., Guangzhou (CN)

(*) Notice: Subject to any disclaimer, the term of this patent is extended or adjusted under 35 U.S.C. 154(b) by 573 days.

(21) Appl. No.: 14/977,807

(22) Filed: Dec. 22, 2015

(65) Prior Publication Data

US 2016/0182650 A1     Jun. 23, 2016

(30) Foreign Application Priority Data

Dec. 22, 2014   (CN) .......................... 2014 1 0817459

(51) Int. Cl.
*G06F 15/173*     (2006.01)
*H04L 29/08*     (2006.01)
(Continued)

(52) U.S. Cl.
CPC .......... *H04L 67/146* (2013.01); *G06F 16/955* (2019.01); *G06F 16/9535* (2019.01); *H04L 67/02* (2013.01); *H04L 67/22* (2013.01)

(58) Field of Classification Search
CPC ....... H04L 67/146; H04L 67/02; H04L 67/22; G06F 17/30867; G06F 17/30876; G06F 16/955
(Continued)

(56) References Cited

U.S. PATENT DOCUMENTS

| 6,119,214 | A  | * | 9/2000 | Dirks ..................... G06F 12/10 711/159 |
| 6,510,439 | B1 | * | 1/2003 | Rangarajan ....... G06F 17/30893 707/709 |

(Continued)

FOREIGN PATENT DOCUMENTS

| CN | 101072103 B | * | 9/2010 |
| CN | 103618698 A | * | 3/2014 |
| CN | 103618807 A | * | 3/2014 |

*Primary Examiner* — Anthony Mejia
(74) *Attorney, Agent, or Firm* — Alston & Bird LLP

(57) ABSTRACT

The present invention discloses a method and an apparatus for isolating a page cookie. The method includes: when a predetermined login account logs in, assigning an independent cookie storage for the predetermined login account; after a request of creating a page associated with the predetermined login account is acquired, establishing a mapping relation table for storing a mapping relation between a page view identification of the page associated with the predetermined login account and the independent cookie storage; when the page associated with the predetermined login account is loaded, looking up the mapping relation table; and initiating, according to the independent cookie storage corresponding to the page view identification of the page associated with the predetermined login account found in the mapping relation table, a request of loading the page associated with the predetermined login account. In this manner, isolation between the page view of the page associated with the predetermined login account and a cookie of a page being logged into by another account in the same domain name is implemented, thereby improving user experiences.

14 Claims, 5 Drawing Sheets

(51) Int. Cl.
*G06F 16/9535* (2019.01)
*G06F 16/955* (2019.01)

(58) Field of Classification Search
USPC .......................................................... 709/226
See application file for complete search history.

(56) References Cited

U.S. PATENT DOCUMENTS

| | | | | |
|---|---|---|---|---|
| 6,591,266 | B1* | 7/2003 | Li | G06F 17/30902 |
| 6,725,269 | B1* | 4/2004 | Megiddo | H04L 63/0421 |
| | | | | 709/228 |
| 7,769,845 | B2* | 8/2010 | Baron | H04L 63/08 |
| | | | | 709/224 |
| 8,312,222 | B1* | 11/2012 | Martin | G06F 17/30902 |
| | | | | 711/133 |
| 8,676,979 | B2* | 3/2014 | Fell | G06F 9/5083 |
| | | | | 709/201 |
| 2002/0083095 | A1* | 6/2002 | Wu | G06Q 30/06 |
| | | | | 715/234 |
| 2011/0246297 | A1* | 10/2011 | Buchalter | G06Q 30/02 |
| | | | | 705/14.53 |
| 2011/0302631 | A1* | 12/2011 | Sureshchandra | G06F 21/34 |
| | | | | 726/4 |
| 2012/0017094 | A1* | 1/2012 | Tulchinsky | G06F 21/6263 |
| | | | | 713/182 |
| 2012/0278881 | A1* | 11/2012 | Mann | G06F 21/6218 |
| | | | | 726/17 |
| 2014/0006619 | A1* | 1/2014 | Hang | G06F 21/41 |
| | | | | 709/225 |
| 2014/0012922 | A1* | 1/2014 | Wu | G06F 17/30893 |
| | | | | 709/205 |
| 2014/0282978 | A1* | 9/2014 | Lerner | H04L 63/083 |
| | | | | 726/7 |
| 2015/0113626 | A1* | 4/2015 | Bocanegra Alvarez | H04L 63/0815 |
| | | | | 726/8 |
| 2015/0163377 | A1* | 6/2015 | Ge | H04N 1/4413 |
| | | | | 358/1.14 |

\* cited by examiner

METHOD AND APPARATUS FOR ISOLATING PAGE COOKIE

CROSS-REFERENCE TO RELATED APPLICATION

This application claims priority to and the benefit of Chinese Patent Application Serial No. 201410817459.0, filed with the State Intellectual Property Office of P.R. China on Dec. 22, 2014, the content of which is incorporated herein by reference in its entirety.

TECHNICAL FIELD

The present invention relates to the field of web page technologies, and in particular, to a method and an apparatus for isolating a page cookie.

BACKGROUND

As internet technologies develop, users are now accustomed to shopping online, making friends on social networks, commenting on online forum, and the like. Related activities on the web pages can be performed only after login is performed by using user names. Moreover, many users generally possess multiple user names on the same website.

A cookie is data stored by a website in a local terminal of a user for identifying an identity of the user, each website server can only store a cookie belonging to its own domain name on a computer of the end user, and the cookie can only be read by the website server of this domain name through a browser. The cookie is stored corresponding to the domain name, and therefore, for the same website, the browser of the user terminal can only allow one user name to automatically login by using the cookie. For example, one user has two login accounts of Taobao, that is, two user names, but a browser can only remember the account that logs in the last time, and when the user intends to log in with the second account, a password still needs to be entered. For another example, a user logs into a page by an account A at a user terminal, and logs into the same page with another account B; when the user refreshes the page being logged into by the account A, a login page of the account A will not be displayed, but instead, a login page of the account B is displayed.

However, user expects that the two accounts may login automatically, or that the login page of the account A is still displayed when the page being logged into by the account A the last time is refreshed, and, therefore, this case easily causes poor user experiences.

SUMMARY

A technical problem to be solved in the present invention is to provide a method and an apparatus for isolating a page cookie, which can implement isolation between a page view of a page associated with a predetermined login account and a cookie of a page being logged into by another account in the same domain name, thereby improving user experiences.

The present invention has the following beneficial effects: different from the case in the prior art, in the present invention, when a predetermined login account logs in, an independent cookie storage is assigned for the predetermined login account; after a request of creating a page associated with the predetermined login account is received, a mapping relation table for storing a mapping relation between a page view identification of the page associated with the predetermined login account and the independent cookie storage is established; when the page associated with the predetermined login account is loaded, the mapping relation table is looked up; and a request of loading the page associated with the predetermined login account is initiated according to the independent cookie storage corresponding to the page view identification of the page associated with the predetermined login account (hereinafter "page view ID") found in the mapping relation table. The independent cookie storage corresponding to the page view ID exists, and therefore, a load request based on the independent cookie storage may be initiated. In this manner, isolation between the page view of the page associated with the predetermined login account and a cookie of a page being logged into by another account in the same domain name can be implemented, thereby improving user experiences.

DETAILED DESCRIPTION

The present invention is described in detail through the accompanying drawings and implementation manners.

Figure 1:
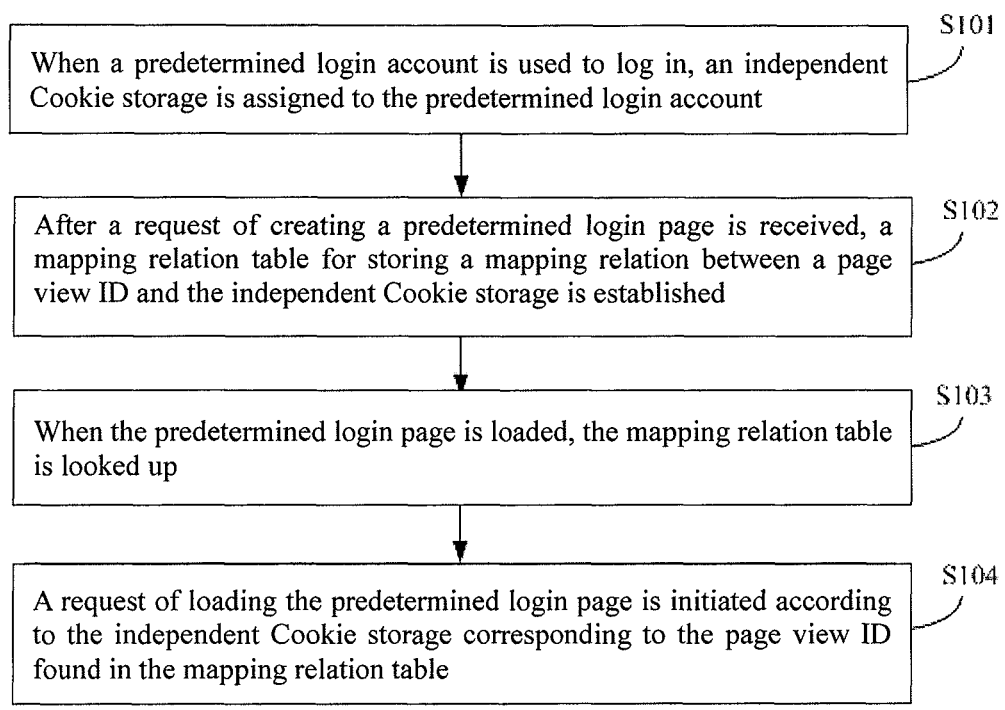
FIG. 1 is a flow chart of a method for isolating a page cookie in accordance with one embodiment.

FIG. 1 is a flow chart of a method for isolating a page cookie in accordance with one embodiment. The method includes the following steps.

Step S101: When user uses a predetermined login account to log in, an independent cookie storage is assigned to the predetermined login account.

The predetermined login account may be a preset account, an account corresponding to a certain domain name (or a website), or an account corresponding to a certain application, such as a Taobao account, a 126 mailbox account, a microblog account, and a browser account. Now, many accounts corresponding to domain names or applications can also be used for login in other situations, and therefore; the predetermined login account may be an account that can login to a website web page of a corresponding domain name thereof, and can also be used for logging into another website or application.

A cookie is data stored by a website in a local terminal of a user for identifying an identity of the user, each website server can only store a cookie belonging to its own domain name on a computer of the end user, and the cookie can only be read by the website server of this domain name through a browser. The cookie is generated by a server, the server sends it to a User-Agent (generally a browser), the browser stores a key/value of the cookie in a text file under a certain directory, and sends the cookie to the server (provided that the browser is set to enable cookies) when the same website is requested the next time; in this way, the server can know whether the user is a legal user, whether re-login is needed, and the like, and the server may set or read information included in the cookie, thereby maintaining a session state of the user and the server.

The cookie is stored corresponding to the domain name, and for the same website, the browser of the user terminal only allows one login account to automatically login by using the cookie; to achieve the objective of avoiding the influence of another login account in the same domain name when the page associated with the predetermined login account is loaded, an independent cookie storage may be assigned to the predetermined login account.

Step S102: After a request of creating a page associated with the predetermined login account is received, a mapping relation table for storing a mapping relation between a page view ID and the independent cookie storage is established.

The page view is used to display a distribution condition of all content of a file on the whole page and positions of the whole file on each page. The page view can be edited. In brief, the page view may also be considered as a page window.

When the page associated with the predetermined login account is created, that is, the request of creating the page associated with the predetermined login account is acquired, in this case, the mapping relation table for storing the mapping relation between the page view ID and the independent cookie storage is established.

Step S103: When the page associated with the predetermined login account is loaded, the mapping relation table is looked up.

Step S104: A request of loading the page associated with the predetermined login account is initiated according to the independent cookie storage corresponding to the page view ID found in the mapping relation table.

The mapping relation table has the mapping relation between the page view ID and the independent cookie storage, and therefore, when the page associated with the predetermined login account is loaded, the mapping relation table may be looked up for the corresponding independent cookie storage according to the page view ID, and the request of loading the page associated with the predetermined login account is initiated according to the found independent cookie storage. When the associated page is displayed, the login account of the page is the predetermined login account.

In this embodiment, when user uses a predetermined login account to log in, an independent cookie storage is assigned to the predetermined login account; after a request of creating a page associated with the predetermined login account is received, a mapping relation table for storing a mapping relation between a page view ID and an independent cookie storage is established; when the page associated with the predetermined login account is loaded, the mapping relation table is looked up; and a request of loading the page associated with the predetermined login account is initiated according to the independent cookie storage corresponding to the page view ID found in the mapping relation table. The independent cookie storage corresponding to the page view ID exists, and therefore, a load request based on the independent cookie storage may be initiated. In this manner, isolation between the page view of the page associated with the predetermined login account and a cookie of a page being logged into by another account in the same domain name can be implemented, thereby improving user experiences.

Figure 2:
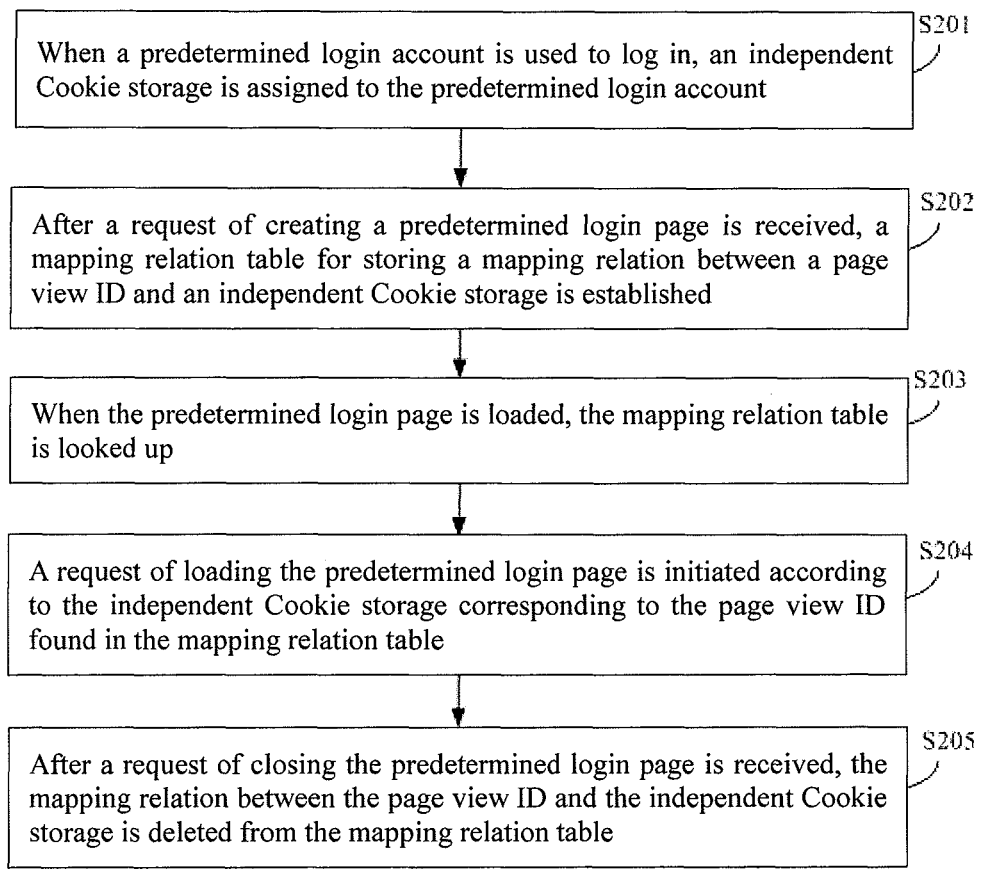
FIG. 2 is a flow chart of another method for isolating a page cookie in accordance with one embodiment.
Figure 3:
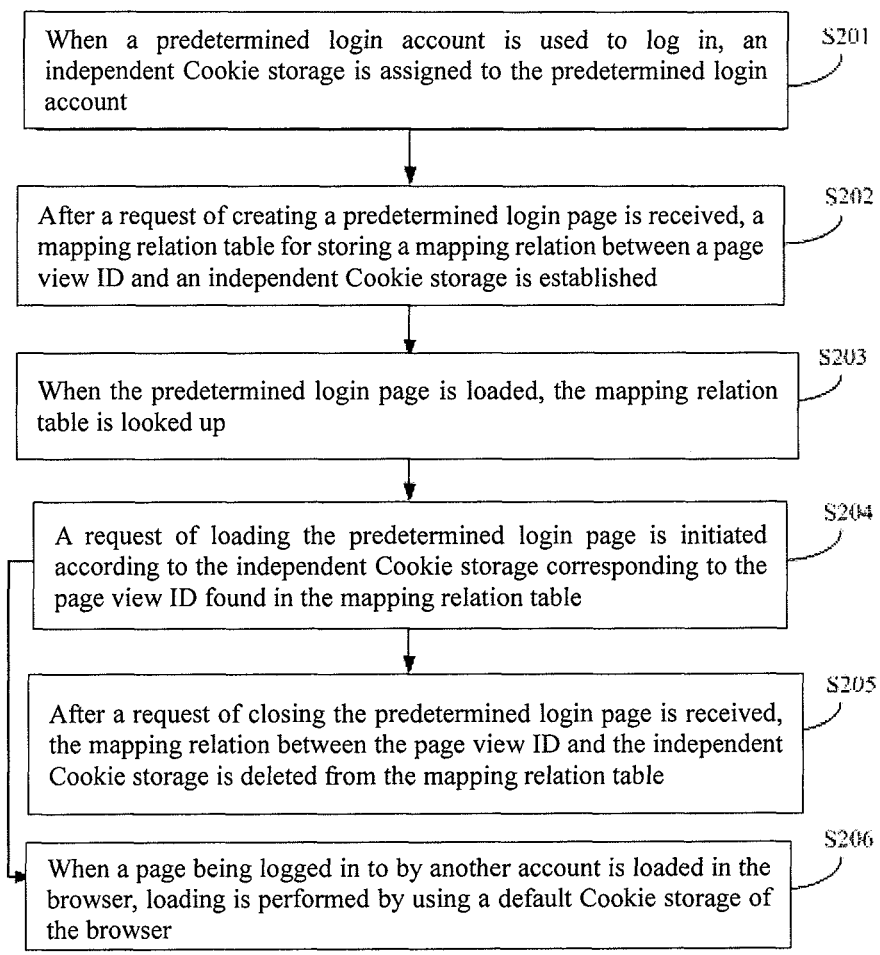
FIG. 3 is a flow chart of another method for isolating a page cookie in accordance with one embodiment.

FIG. 2 and FIG. 3 are flow charts of other two implementation manners of a method for isolating a page cookie according to the present invention, and include the following steps.

Step S201: When a predetermined login account is used to log in, an independent cookie storage is assigned to the predetermined login account.

When the predetermined login account is a browser account, and the page associated with the predetermined login account is a page for login based on the browser account, the step S201 comprises: when logging into the browser by using the predetermined login account, assigning an independent cookie storage for a login account of the browser, so as to be different from a cookie storage of a default page of the browser.

The page for login based on the browser account may be, for example, a popup (or bubble) page on the browser, and the popup page is a quick page service provided by the browser for the user, such as a shopping cart, email, and microblog. A default page of the browser refers to a page opened in the browser, such as a Taobao page, a Paipai page, and a Jingdong page opened in the browser. When logging into the browser, the user enters a login account, and when the login account is received, an independent cookie storage is assigned to the login account of the browser, so as to be different from the cookie storage of the default page of the browser.

In the prior art, by default, for the same website, a popup page of the browser and a default page of the browser use the same cookie storage. For example, an account A and an account B are accounts of the same website. The user logs in to the browser by using the account A, opens a corresponding website in the browser to log in by using the account B, and in this case, the user clicks the popup page on the browser, it displays the user is logging in using the account B rather than using the account A. However, the user expects that logging in using the account A is displayed on the popup page. When the popup page displays logging in using the account A, if the website page to which the account B logs in before is refreshed after the popup page is loaded, the account B used in the web page is invalid, and the account A is displayed after the web page is jumped or refreshed.

When the predetermined login account is the browser account, a cookie storage is assigned to the login account of the browser, which is different from a cookie storage of the default page of the browser. Then the correspondence between the page view ID associated with the browser account and the independent cookie storage is established, so that cookie isolation between the page view of a page associated with the browser account and a page view of a page associated with a non-browser account belonging to the same domain name (or website) can be implemented. In this manner, user experiences can be improved.

Step S202: After a request of creating a page associated with a predetermined login account is received, a mapping relation table for storing a mapping relation between a page view ID and an independent cookie storage is established.

Step S203: When the page associated with the predetermined login account is loaded, the mapping relation table is looked up.

Step S204: A request of loading the page associated with the predetermined login account is initiated according to the independent cookie storage corresponding to the page view ID found in the mapping relation table.

Step S205: After a request of closing the page associated with the predetermined login account is received, the mapping relation between the page view ID and the independent cookie storage is deleted from the mapping relation table.

If the page associated with the predetermined login account is closed, that is, after a closing request is received, the mapping relation between the page view ID and the independent cookie storage may be deleted from the mapping relation table. In this manner, when the mapping relation between the page view ID and the independent cookie storage is not needed, it can be deleted to save the storage space.

Step S206: When a page being logged into by another account belonging to the same domain name with the predetermined login account is loaded in the browser, loading is performed by using a default cookie storage of the browser.

When the page being logged into by another account belonging to the same domain name as the predetermined login account is refreshed in the browser, the page view does not establish a mapping relation between the page view identification and the cookie storage, and therefore, a request is initiated by directly using the default cookie storage, and the page being logged into by another account is still displayed.

In the implementation manner of the present invention, when a predetermined login account logs in, an independent cookie storage is assigned to the predetermined login account. After a request of creating a page associated with the predetermined login account is received, a mapping relation table for storing a mapping relation between a page view ID and an independent cookie storage is established. When the page associated with the predetermined login account is loaded, the mapping relation table is looked up; and a request of loading the page associated with the predetermined login account is initiated according to the independent cookie storage corresponding to the page view ID found in the mapping relation table. The independent cookie storage corresponding to the page view ID exists, and therefore, a load request based on the independent cookie storage may be initiated. In this manner, isolation between the page view of the page associated with the predetermined login account and a cookie of a page being logged into by another account in the same domain name can be implemented, thereby improving user experiences.

The method for isolating a page cookie of the present invention is described by using a specific example in the following descriptions.

A browser is a UC browser. User may login to UC browser using a Taobao account. A popup page of the browser is a page of Taobao on which an order is placed. After a user clicks a shopping cart on a tool bar of the browser, the popup page may be opened.

A specific process of this embodiment is described as follows:

1. When a Taobao account A logs in to the browser, an independent cookie storage is assigned to it, which is different from a cookie storage of a default page of the browser.

2. After the user clicks a shopping cart button, a popup page of the browser pops out. After the popup page of the browser is created, a page view identification thereof is registered to a resource distributer, and it is designated that all requests of the page view use the cookie storage of the browser login account, that is, a mapping relation between the page view identification of the popup page of the browser and the independent cookie storage is established, and is stored into a mapping relation table.

3. The popup page of the browser accesses a uniform resource locator (URL) of an order list. When the load request reaches the resource distributer of the browser, the resource distributer looks up the mapping relation table and finds in the mapping relation table that the page view identification has a designated cookie storage, and initiates the load request directly using the cookie storage.

4. The resource distributer initiates the load request based on the cookie storage of the browser login account, and displays the page. In this case, the account A is in a login status in the popup page.

5. The user closes the popup page of the browser, removes registration information of the page view identification thereof from the resource distributer, and at the same time, deletes the mapping relation between the page view identification of the popup page of the browser and the independent cookie storage from the mapping relation table.

6. The user has logged into a Taobao web page by an account B before the browser refreshes. A page load request is initiated again to the resource distributer of the browser. The resource distributer looks up the mapping relation table. In this case, a cookie storage corresponding to a page view identification of the Taobao web page is not found in the mapping relation table, and a load request is initiated by directly using the defaulted cookie storage.

7. The browser initiates a network load request based on the defaulted cookie storage, and displays the page. In this case, the account B is in a login state in the browser page.

Figure 4:
FIG. 4 is a schematic diagram of a method for isolating a page cookie in accordance with one embodiment.

FIG. 4 is a schematic effect diagram of a method for isolating a page cookie according to the present invention in an actual application. After a browser is launched, an account "xiangyangzhao" logs in to the browser, an account "神翼德" logs in to a default page of the browser, a shopping cart button is clicked to display an order list of "xiangyangzhao". When the page in the browser is refreshed, in this case, the account "神翼德" in the page is still in a normal login status.

Figure 5:
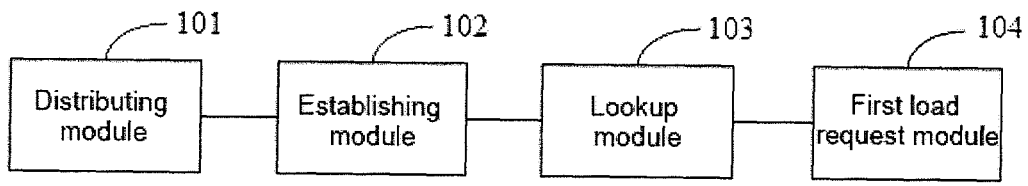
FIG. 5 is a schematic structural diagram of an apparatus for isolating a page cookie in accordance with one embodiment.

FIG. 5 is a schematic structural diagram of an implementation manner of an apparatus for isolating a page cookie according to the present invention. The apparatus includes: an assigning module 101, an establishing module 102, a lookup module 103, and a first load request module 104.

The assigning module 101 is configured to assign an independent cookie storage for the predetermined login account when a predetermined login account logs in.

The predetermined login account may be a preset account, an account corresponding to a certain domain name (or a website), or an account corresponding to a certain application, such as a Taobao account, a 126 mailbox account, a microblog account, and a browser account. Now, many accounts corresponding to domain names or applications can also be used for login in other situations, and therefore, the predetermined login account may be an account that can login to a website web page of a corresponding domain name thereof, and can also be used for logging in to another website or application.

A cookie is data stored by a website in a local terminal of a user for identifying an identity of the user. Each website server can only store a cookie belonging to its own domain name on a computer of the end user, and the cookie can only be read by the website server of this domain name through a browser. The cookie is generated by a server, the server sends it to a User-Agent (generally a browser), and the browser stores a key/value of the cookie in a text file under a certain directory, and sends the cookie to the server (provided that the browser is set to enable cookies) when the same website is requested the next time. In this way, the server can know whether the user is a legal user, whether re-login is needed, and the like, and the server may set or read information included in the cookie, thereby maintaining a session state of the user and the server.

The cookie is stored corresponding to the domain name, and for the same website, the browser of the user terminal only allows one login account to automatically login by using the cookie. To achieve the objective of avoiding the influence of another login account in the same domain name when a page associated with a predetermined login account is loaded, an independent cookie storage may be assigned to the predetermined login account.

The establishing module 102 is configured to establish a mapping relation table for storing a mapping relation between a page view ID and the independent cookie storage after a request of creating a page associated with a predetermined login account is received;

The page view is used to display a distribution condition of all content of a file on the whole page and positions of the whole file on each page, and can be edited. In brief, the page view may also be considered as a page window.

When the page associated with the predetermined login account is created, that is, the request of creating the page associated with the predetermined login account is received, in this case, the mapping relation table for storing the mapping relation between the page view ID and the independent cookie storage is established.

The lookup module 103 is configured to look up the mapping relation table when the page associated with the predetermined login account is loaded.

The first load request module 104 is configured to initiate, according to the independent cookie storage corresponding to the page view ID found in the mapping relation table, a request of loading the page associated with the predetermined login account.

The mapping relation table has the mapping relation between the page view ID and the independent cookie storage, and therefore, when the page associated with the predetermined login account is loaded, the mapping relation table may be looked up for the corresponding independent cookie storage according to the page view ID. The request of loading the page associated with the predetermined login account is initiated according to the found independent cookie storage. When the associated page is displayed, the login account is the predetermined login account.

In the implementation manner of the present invention, when user uses a predetermined login account to log in, an independent cookie storage is assigned to the predetermined login account. After a request of creating a page associated with the predetermined login account is received, a mapping relation table for storing a mapping relation between a page view ID and an independent cookie storage is established. When the page associated with the predetermined login account is loaded, the mapping relation table is looked up. A request of loading the page associated with the predetermined login account is initiated according to the independent cookie storage corresponding to the page view ID found in the mapping relation table. The independent cookie storage corresponding to the page view identification of the page associated with the predetermined login account exists, and therefore, a load request based on the independent cookie storage may be initiated. In this manner, isolation between the page view of the page associated with the predetermined login account and a cookie of a page being logged in to by another account in the same domain name can be implemented, thereby improving user experiences.

Figure 6:
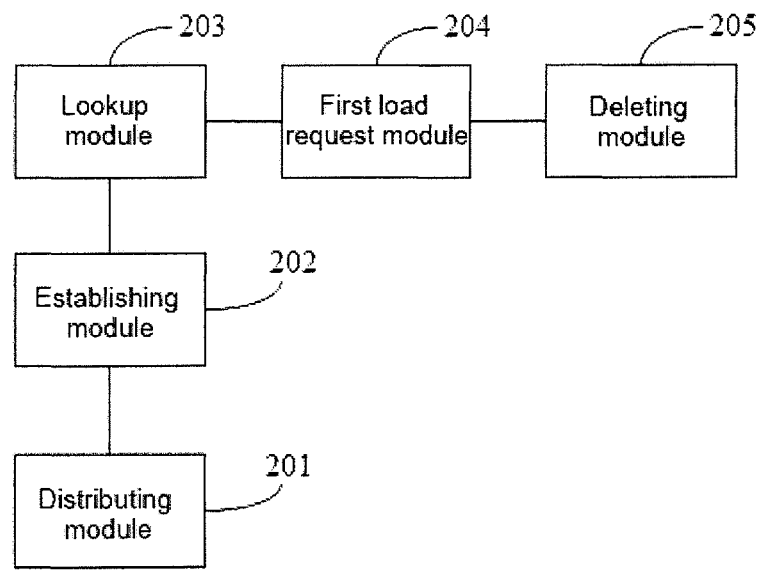
FIG. 6 is a schematic structural diagram of an apparatus for isolating a page cookie in accordance with one embodiment.
Figure 7:
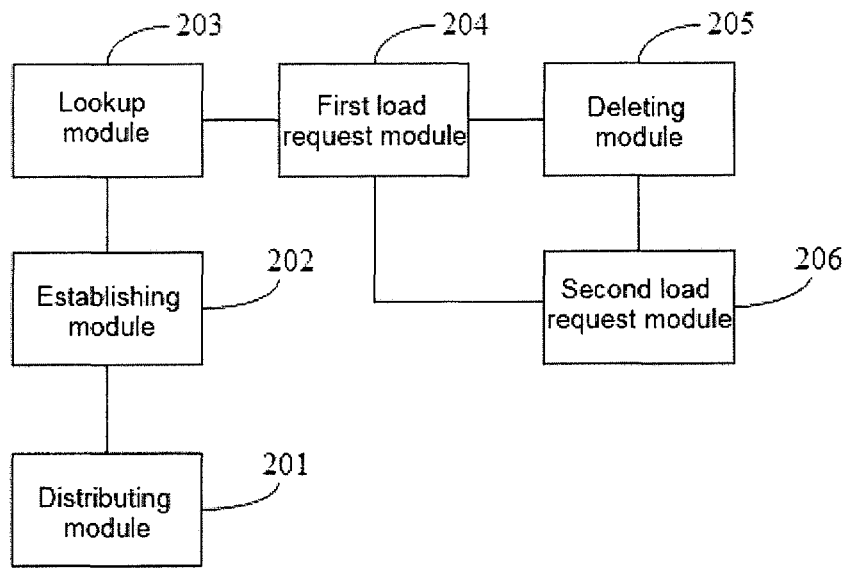
FIG. 7 is a schematic structural diagram of an apparatus for isolating a page cookie in accordance with one embodiment.

FIG. 6 and FIG. 7 are schematic structural diagrams of other two implementation manners of an apparatus for isolating a page cookie according to the present invention. The apparatus includes: an assigning module 201, an establishing module 202, a lookup module 203, and a first load request module 204.

The assigning module 201 is configured to assign an independent cookie storage to the predetermined login account when user uses a predetermined login account to log in.

When the predetermined login account is a browser account and the page associated with the predetermined login account is a page for login based on a browser account, the assigning module 201 is specifically configured to assign an independent cookie storage to a login account of the browser when logging into the browser by using the predetermined login account, so as to be different from a cookie storage of a default page of the browser.

The page for login based on the browser account may be, for example, a popup page on the browser, and the popup page is a quick page service provided by the browser for the user, such as a shopping cart, email, and microblog. A default page of the browser refers to a page opened in the browser, such as a Taobao page, a Paipai page, and a Jingdong page opened in the browser. When logging into the browser, the user enters a login account. When the login account is received, an independent cookie storage is assigned to the login account of the browser, so as to be different from a cookie storage of a default page of the browser.

In the prior art, by default, for the same website, a popup page of the browser and a default page of the browser use the same cookie storage, for example, an account A and an account B are accounts of the same website. The user logs in to the browser by using the account A, opens a corresponding website in the browser to log in by using the account B. In this case, the user clicks the popup page on the browser, logging in using the account B is displayed instead of logging in using the account A. However, the user expects that logging in using the account A is displayed on the popup page. If the popup page displays logging in using the account A, when the website page to which the account B logs in before is refreshed after the popup page is loaded, the account B used in the web page is invalid. The account A is displayed after the web page is jumped or refreshed.

When the predetermined login account is the browser account, a cookie storage is assigned to the login account of the browser, which is different from a cookie storage of the default page of the browser. Then, the correspondence between the page view ID associated with the browser account and the independent cookie storage is established, so that cookie isolation between the page view of the page associated with the browser account and a page view of a page associated with a non-browser account belonging to the same domain name can be implemented. By using the above example as an example, when the user clicks the shopping cart popup page in the browser, logging in using account A is displayed, rather than using the account B. In this manner, user experiences can be improved.

The establishing module 202 is configured to establish a mapping relation table for storing a mapping relation between a page view ID and the independent cookie storage after a request of creating a page associated with a predetermined login account is received.

The lookup module 203 is configured to look up the mapping relation table when the page associated with the predetermined login account is loaded.

The first load request module 204 is configured to initiate, according to the independent cookie storage corresponding to the page view ID found in the mapping relation table, a request of loading the page associated with the predetermined login account.

The apparatus further includes a deleting module 205.

The deleting module 205 is configured to delete the mapping relation between the page view ID and the independent cookie storage from the mapping relation table after a request of closing the page associated with the predetermined login account is received.

If the page associated with the predetermined login account is closed, that is, after a closing request is received, the mapping relation between the page view ID and the independent cookie storage may be deleted from the mapping relation table. In this manner, when the mapping relation between the page view ID and the independent cookie storage is not needed, it can be deleted to save the storage space.

Referring to FIG. 7, the apparatus further includes a second load request module 206.

The second load request module 206 is configured to load by using a cookie storage defaulted by the browser when a page being logged into by another account belonging to the same domain name with the predetermined login account is loaded in the browser.

When the page being logged into by another account belonging to the same domain name as the predetermined login account is refreshed in the browser, the page view does not establish a mapping relation between the page view identification and the cookie storage. Therefore, a request is initiated by directly using the default cookie storage, and the page being logged into by another account is still displayed.

In the implementation manner of the present invention, when a predetermined login account logs in, an independent cookie storage is assigned to the predetermined login account. After a request of creating a page associated with the predetermined login account is received, a mapping relation table for storing a mapping relation between a page view ID and an independent cookie storage is established. When the page associated with the predetermined login account is loaded, the mapping relation table is looked up. A request of loading the page associated with the predetermined login account is initiated according to the independent cookie storage corresponding to the page view ID found in the mapping relation table. Since the independent cookie storage corresponding to the page view ID exists, a load request based on the independent cookie storage may be initiated. In this manner, isolation between the page view of the page associated with the predetermined login account and a cookie of a page being logged into by another account in the same domain name can be implemented, thereby improving user experiences.

The above descriptions are implementation manners of the present invention, and are not intended to limit the scope of the present invention. Any equivalent structure or equivalent flow variation made by using the description and accompanying drawings of the present invention and applied directly or indirectly in other related technical fields shall all fall within the protection scope of the present invention.

That which is claimed:

1. A method for isolating a page cookie, wherein the method comprises:
when a predetermined login account logs in to a browser, assigning an independent cookie storage for the predetermined login account, wherein the independent cookie storage is different from a cookie storage of a default page of the browser;
after a request of creating a page associated with the predetermined login account is acquired, establishing a mapping relation table for storing a mapping relation between a page view identification of the page associated with the predetermined login account and the independent cookie storage;
when the page associated with the predetermined login account is loaded, looking up the mapping relation table and identifying from the mapping relation table that the page view identification has a mapping relation to the independent cookie storage;
initiating, according to the independent cookie storage corresponding to the page view identification in the mapping relation table, a request of loading the page associated with the predetermined login account; and
when a page being logged into by another account belonging to the same domain name with the predetermined login account is loaded in the browser, looking up the mapping relation table and identifying from the mapping relation table that a mapping relation between the page view identification of the page associated with the another account and the independent cookie storage is not found, loading the page by using the cookie storage defaulted by the browser.

2. The method according to claim 1, wherein the predetermined login account is a browser account; and the page associated with the predetermined login account is a page for login based on the browser account.

3. The method according to claim 2, wherein the step of when a predetermined login account logs in, assigning an independent cookie storage for the predetermined login account comprises:
when the predetermined login account logs in to the browser, assigning an independent cookie storage for a login account of the browser, so as to be different from the cookie storage of the default page of the browser.

4. The method according to claim 1, wherein the method further comprises:
after a request of closing the page associated with the predetermined login account is received, deleting the mapping relation between the page view identification and the independent cookie storage from the mapping relation table.

5. The method according to claim 2, wherein the method further comprises: when the page being logged into by the another account belonging to the same domain name with the predetermined login account is loaded in the browser, loading by using the cookie storage defaulted by the browser.

6. The method according to claim 3, wherein the method further comprises: when the page being logged into by the another account belonging to the same domain name with the predetermined login account is loaded in the browser, loading by using the cookie storage defaulted by the browser.

7. The method according to claim 4, wherein the method further comprises: when the page being logged into by the another account belonging to the same domain name with the predetermined login account is loaded in the browser, loading by using the cookie storage defaulted by the browser.

8. An apparatus for isolating a page cookie, wherein the apparatus comprises at least one processor and at least one non-volatile computer readable medium including computer program code, the at least one non-volatile memory and the computer code configured to, with the processor, cause the apparatus to at least:

when a predetermined login account logs in to a browser, assign an independent cookie storage for the predetermined login account, wherein the independent cookie storage is different from a cookie storage of a default page of the browser;

after a request of creating a page associated with the predetermined login account is acquired, establish a mapping relation table for storing a mapping relation between a page view identification of the page associated with the predetermined login account and the independent cookie storage;

when the page associated with the predetermined login account is loaded, look up the mapping relation table and identify from the mapping relation table that the page view identification has a mapping relation to the independent cookie storage;

initiate, according to the independent cookie storage corresponding to the page view identification in the mapping relation table, a request of loading the page associated with the predetermined login account; and when a page being logged into by another account belonging to the same domain name with the predetermined login account is loaded in the browser, look up the mapping relation table and identify from the mapping relation table that a mapping relation between the page view identification of the page associated with the another account and the independent cookie storage is not found, load the page by using the cookie storage defaulted by the browser.

9. The apparatus according to claim 8, wherein the predetermined login account is a browser account; and the page associated with the predetermined login account is a page for login based on the browser account.

10. The apparatus according to claim 9, wherein the at least one non-volatile memory and the computer program code are further configured to, with the processor, cause the apparatus to when the predetermined login account logs in to the browser, assign an independent cookie storage for a login account of the browser, so as to be different from the cookie storage of the default page of the browser.

11. The apparatus according to claim 8, wherein the at least one non-volatile memory and the computer program code are further configured to, with the processor, cause the apparatus to after a request of closing the page associated with the predetermined login account is received, delete the mapping relation between the page view identification and the independent cookie storage from the mapping relation table.

12. The apparatus according to claim 9, wherein the at least one non-volatile memory and the computer program code are further configured to, with the processor, cause the apparatus to when the page being logged into by the another account belonging to the same domain name with the predetermined login account is loaded in the browser, load by using the cookie storage defaulted by the browser.

13. The apparatus according to claim 10, wherein the at least one non-volatile memory and the computer program code are further configured to, with the processor, cause the apparatus to when the page being logged into by the another account belonging to the same domain name with the predetermined login account is loaded in the browser, load by using the cookie storage defaulted by the browser.

14. The apparatus according to claim 11, wherein the at least one non-volatile memory and the computer program code are further configured to, with the processor, cause the apparatus to when the page being logged into by the another account belonging to the same domain name with the predetermined login account is loaded in the browser, load by using the cookie storage defaulted by the browser.

\* \* \* \* \*